Patented Sept. 20, 1932

1,877,756

UNITED STATES PATENT OFFICE

MAX BOCKMÜHL, GUSTAV EHRHART, AND LEONHARD STEIN, OF FRANKFORT-ON-THE-MAIN, GERMANY

COMPOUNDS OF THE 1-PHENYL-2-ALKYLAMINO-ALCOHOL-1 SERIES HYDROXYLATED IN THE PHENYL RESIDUE AND PROCESS OF PREPARING THEM

No Drawing. Application filed December 29, 1930, Serial No. 505,460, and in Germany December 6, 1929.

The present invention relates to compounds of the 1-phenyl-2-alkylamino-alcohol-1 series hydroxylated in the phenyl nucleus and to a process of preparing them.

We have found that compounds of the 1-phenyl-2-alkylamino-alcohol-1 series oxylated in the phenyl nucleus are obtainable by treating a compound of the group comprising ortho-, meta-, and para-mono-benzyl- and 3.4-dibenzyl oxy-propiophenone with a halogenating agent and reacting the compound thus obtainable with methylbenzylamine and subjecting the compounds thus obtainable to a hydrogenation process in the presence of a hydrogenation catalyst in the form of their salts or as free bases, the aralkyl groups of the compounds being simultaneously split off.

The halogenating process is preferably carried out in the presence of a diluent, as for instance methylene chloride and in the presence of an acid-binding agent, as for instance potassium carbonate or calcium carbonate.

The reaction of the halogenated compounds with the alkyl-aralkylamine compound is preferably effected according to the process described in Canadian Patent specification No. 291,001, dated July 2, 1929.

A palladium catalyst is preferably used as catalyst in the hydrogenation process.

The compounds obtainable according to our process are valuable therapeutic products.

The following examples serve to illustrate the invention, but they are not intended to limit it thereto:

(1) 43 grams of ortho-benzyl-oxypropiophenone are dissolved in 250 cc. of methylene chloride and, after addition of 15 grams of calcium carbonate, 32 grams of bromine are introduced drop by drop, while stirring. After about 2 hours the reaction is complete. The precipitate is filtered by suction and the liquid is washed with caustic soda solution and water. The methylene chloride solution separated is dried and concentrated in a vacuum. 40 grams of ortho-benzyl-oxybromopropiophenone are obtained which are dissolved in about four times their volume of alcohol. Into this solution 30 grams of methylbenzylamine are introduced drop by drop. The whole is allowed to stand for several hours and the excess of alcohol is then distilled in a vacuum. The residue is dissolved with water and ether and the ethereal solution is separated and shaken with dilute hydrochloric acid. On addition of potassium carbonate the base separates from the acid solution and the base is then extracted with ether. The residue left on evaporating the ether is then dissolved in alcohol and hydrogenated with palladium and hydrogen. As soon as the calculated quantity of hydrogen has been absorbed, the palladium is filtered by suction and the alcohol is evaporated; the residue is dissolved in acetic ether and dry, gaseous hydrochloric acid is introduced. The ortho-hydroxy-phenyl-methylaminopropanol-hydrochloride which separates is recrystallized from alcohol with addition of ether. The compound melts at 176° C. The ortho-benzyl-oxypropiophenone used as starting material is obtained by benzylating ortho-hydroxypropiophenone with benzyl bromide. An oil boiling at 158° C. under 1 mm. pressure is obtained with an excellent yield. It crystallizes after a short time and melts at 50° C.–51° C.

(2) 10 grams of meta-benzyloxypropiophenone are dissolved in 100 cc. of methylene chloride and 2.4 cc. of bromine are introduced drop by drop, while stirring. As soon as the solution has lost its color, the whole is poured in ice water, the methylene chloride solution is separated and washed with bicarbonate solution until it is neutral. After distillation of the methylene chloride, 13.7 grams of a residue are obtained which is dissolved in 20 cc. of alcohol and transformed with 10.6 grams of methylbenzylamine. After 4–5 hours the alcohol is distilled in a vacuum and the residue is extracted with water and ether. The separated ethereal solution is shaken with dilute hydrochloric acid and the aqueous solution is washed with ether. The aqueous portion is rendered alkaline by means of a potassium carbonate solution and extracted with ether, the ethereal extract is dried and the ether is distilled. The residue is dissolved in 100 cc. of alcohol and hydrogenated with palladium and hydrogen and worked up as indicated in Example 1; the hydrochloride melts at 185° C.-186° C. The yield amounts to 5 grams. The metabenzyloxypropiophenone used in this reaction may be prepared as follows:—

A Grignard-solution of 12 grams of magnesium and 60 grams of ethyl bromide in 250 cc. of dry ether is gradually introduced drop by drop into a solution of 94 grams of metabenzyloxybenzaldehyde in 400 cc. of dry ether. The whole is poured on ice and well acidified with concentrated hydrochloric acid. The ether solution is separated and shaken at first with a bisulfite solution, then with a sodium carbonate solution and finally with water. After drying by means of sodium sulfate, the ether is evaporated and the residue is distilled in a vacuum. The metabenzyloxyphenylethylcarbinol obtained distils at 160° C.-162° C. at ½ mm. pressure. The yield amounts to 85 grams. The metabenzyloxypropiophenone is formed from the carbinol by oxidation with chromic acid. For this purpose 75 grams of meta-benzyloxyphenylethylcarbinol are slowly introduced drop by drop into a solution of 150 grams of potassium dichromate and 125 grams of sulfuric acid in 750 cc. of water. After several hours the oxidation is complete. The ketone is extracted by means of ether and distilled, after washing the ethereal solution and evaporating the ether, in a vacuum. It boils at 153° C.-155° C. at ½ mm. pressure. The meta-benzyloxypropiophenone is obtained with a yield of 55-60 grams.

Bromine can be transformed in the same manner, whereby the meta-benzyloxybenzylaminopropiophenone is formed which, by reduction, is transformed into the 1-(meta-hydroxyphenyl)-2-aminopropan-1-ol. The hydrochloride of this substance melts at 180° C.-181° C.

(3) 55 grams of para-benzyloxypropiophenone are dissolved in 250 grams of methylene chloride and brominated with 38 grams of bromine. As soon as all of the bromine has been introduced drop by drop, the methylene chloride solution is washed with caustic soda solution and water. The solvent is eliminated in a vacuum and the residue is dissolved in petroleum ether. The crystalline mass which soon separates is filtered by suction and washed with petroleum ether. When recrystallized from hexahydrobenzene, the para-benzyloxybromopropiophenone melts at 80° C. 40 grams of this compound are obtained which are then transformed in an alcoholic solution with 30 grams of methylbenzylamine. After the whole has been allowed to stand for 1 day, the excess of alcohol is distilled in a vacuum and the residue is dissolved with ether. By washing with water, the benzylmethylaminehydrobromide formed is eliminated and the ether is removed by evaporation. The ether residue soon begins to crystallize and the para-benzyloxymethylbenzylaminopropriophenone is obtained with a good yield; when recrystallized from petroleum ether of low boiling point it melts at 58° C.-60° C. In order to obtain the para-hydroxyphenylmethylaminopropanol 15 grams of para-benzyloxymethylbenzylaminopropriophenone are dissolved in alcohol and the solution is hydrogenated with palladium and hydrogen. As soon as the required quantity of hydrogen has been absorbed the palladium is filtered by suction and the alcohol is evaporated in a vacuum. The residue is extracted with acetic ether and the hydrochloride is precipitated from the solution by means of dry hydrochloric acid gas. The yield amounts to 8.0 grams. When recrystallized from absolute alcohol, the compound melts at 212° C. The para-benzyloxypropiophenone used for the transformation is prepared by adding to a solution of 6.9 grams of sodium in 230 cc. of absolute alcohol 45 grams of para-hydroxypropiophenone and 54 grams of benzyl bromide and boiling for 1 hour in a reflux apparatus. The excess of alcohol is then distilled and the residue is extracted with ether and water. After drying it the ethereal solution is evaporated and the residue is recrystallized from alcohol of 95 per cent. strength. The yield amounts to 60 grams. The para-benzyloxypropiophenone melts at 100° C.-101° C.

(4) 34.6 grams of 3.4-dibenzyloxypropiophenone are dissolved in 300 cc. of methylene chloride and, after addition of 12 grams of calcium carbonate, 16 grams of bromine are introduced drop by drop, while stirring. After the reaction is complete, the calcium precipitate is filtered by suction and the methylene chloride solution is completely evaporated. On cooling the 3.4-dibenzyloxybromopropiophenone crystalizes from the residue; after recrystallization from hexahydrobenzene or alcohol, it melts at 93° C.-94° C. 30 grams of this bromo-derivative are then dissolved in 60 cc. of alcohol and heated for a short time on the water bath with 17 grams of methylbenzylamine. After standing for several hours, the methylbenzylamine-hydrobromide which has separated is filtered by suction and the alcoholic solution is evaporated. The residue is dissolved in ether, filtered and the hydrochloride is precipitated by means of gaseous hydrochloric acid; the precipitate first has the form of an oil. On addition of acetone, a crystalline mass is obtained, which, when recrystallized from acetone, melts at 170° C. The 3.4-dibenzyloxymethylbenzylaminopropiophenone hydrochloride thus obtained is then dissolved in absolute alcohol and hydrogenated with palladium and hydrogen. After the calculated quantity of hydrogen has been taken up, the palladium is filtered by suction and the alcoholic solution is evaporated in a vacuum. The residue soon begins to crystallize and the 3.4-dioxyphenylmethylaminopropanol hydrochloride is obtained in a pure form by recrystallization from alcohol with addition of ether. It melts at 190° C.–191° C. The 3.4-dibenzyloxypropiophenone used as parent material is obtained by introducing 166 grams of propiobrenzcatechin and 350 grams of benzyl bromide into 1000 cc. of an alcoholic caustic potash solution of 12 per cent. strength. After heating for about 2 hours on the waterbath the product, which is still hot, is mixed with water which dissolves the potassium bromide formed during the reaction. On cooling, there crystallizes the dibenzyl compound which, after recrystallization from hexyhydrobenzene, melts at 66° C.

We claim:

1. The process which comprises treating a compound of the group comprising ortho-, meta-, and para-mono-benzyl- and 3.4-dibenzyl-oxypropiophenone with a halogenating agent and reacting the compounds thus obtainable with methylbenzylamine and subjecting the compounds thus obtainable to a hydrogenation process in the presence of a hydrogenation catalyst in the form of their salts or as free bases, the benzyl groups of the compounds being simultaneously split off.

2. The process which comprises treating a compound of the group comprising ortho-, meta-, and para-mono-benzyl- and 3.4-dibenzyloxypropiophenone with a halogenating agent in the presence of a diluent and an acid-binding agent and reacting the compounds thus obtainable with methylbenzylamine and subjecting the compound thus obtainable to a hydrogenation process in the presence of a hydrogenation catalyst in the form of their salts or as free bases, the benzyl group of the compounds being simultaneously split off.

3. The process which comprises treating a compound of the following probable formula

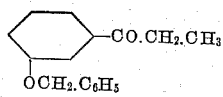

with a brominating agent in the presence of a diluent and an acid binding agent and reacting the compound thus obtained with methylbenzylamine and subjecting the compound thus obtained to a hydrogenation process in the presence of a hydrogenation catalyst in the form of its salts or as free base, the benzyl groups of the compound being simultaneously split off.

4. The process which comprises treating a compound of the following probable formula with a brominating agent in the presence of methylene chloride and potassium carbonate and reacting the compound thus obtained with methylbenzylamine and subjecting the compound thus obtained as hydrochloric acid salt to a hydrogenation process in the presence of a palladium catalyst, the benzyl groups of the compound being simultaneously split off.

5. As new products, the compounds of the following general formula wherein X stands for hydrogen or hydroxy, being therapeutic products.

6. As a new product, the compound of the following probable formula melting as hydrochloride at 185° C.–186° C. and being a therapeutic product.

7. As a new product, the compound of the following probable formula being a therapeutic product melting as hydrochloride at 190° C.–191° C.

In testimony whereof, we affix our signatures.

M. BOCKMÜHL.
G. EHRHART.
LEONH. STEIN.